(12) United States Patent
Teich

(10) Patent No.: US 6,595,397 B2
(45) Date of Patent: Jul. 22, 2003

(54) STORAGE CONTAINER ATTACHMENT DEVICE

(75) Inventor: Michael Teich, Mannheim (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/897,213

(22) Filed: Jul. 2, 2001

(65) Prior Publication Data

US 2002/0014506 A1 Feb. 7, 2002

(30) Foreign Application Priority Data

Jul. 25, 2000 (DE) .......................... 100 36 076

(51) Int. Cl.⁷ .................................. B60R 9/00
(52) U.S. Cl. .................. 224/410; 224/510; 224/521; 224/544; 293/115
(58) Field of Search .................. 224/401, 410, 224/500, 510, 511, 519, 521, 543, 544; 293/115, 118; 280/164.1

(56) References Cited

U.S. PATENT DOCUMENTS

| | | | |
|---|---|---|---|
| 2,981,554 A | * 4/1961 | Mulder et al. | 182/129 |
| 3,176,903 A | * 4/1965 | Farley | 224/490 |
| 3,749,436 A | * 7/1973 | Hitchcock | 224/410 |
| 4,138,152 A | * 2/1979 | Prue | 224/491 |
| 4,856,686 A | * 8/1989 | Workentine | 224/497 |
| 5,215,234 A | * 6/1993 | Pasley | 224/508 |
| 5,224,636 A | * 7/1993 | Bounds | 224/281 |
| 5,439,151 A | * 8/1995 | Clayton | 224/282 |
| 5,443,189 A | * 8/1995 | Hirschfeld | 224/282 |
| 5,586,702 A | * 12/1996 | Sadler | 224/281 |
| 6,036,070 A | * 3/2000 | Gauthier et al. | 224/521 |
| 6,039,227 A | * 3/2000 | Stark | 206/315.3 |

OTHER PUBLICATIONS

Profi Nr. 7/00, Jul. 2000, p. 14.
Deere & Co., DE Gerschmacksmusterblatt Heft, M 9408060, 1996, p. 3190.

* cited by examiner

Primary Examiner—Stephen K. Cronin

(57) ABSTRACT

A storage container includes an attachment device for detachably mounting the storage container to a utility vehicle. The attachment device includes a mounting bar and a pair of bolts or support elements. The mounting bar projects rearwardly from a rear wall, and includes a vertically extending mounting bores. The bolts projects rearwardly from the rear wall of the container by an adjustable distance. In order to mount the storage container to the front of the vehicle, the mounting bar is inserted into jaw-like hitch recess of a towing attachment of vehicle. A pin is inserted through vertical bores of the towing attachment and through the mounting bore of the mounting bar.

12 Claims, 3 Drawing Sheets

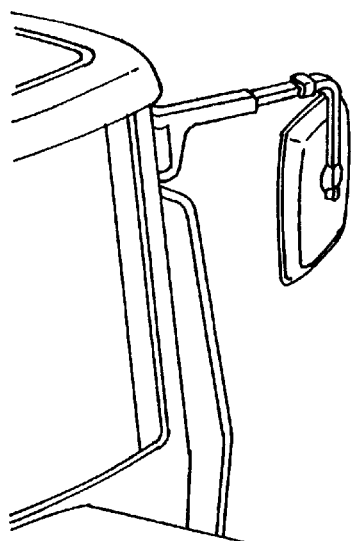
FIG. 1
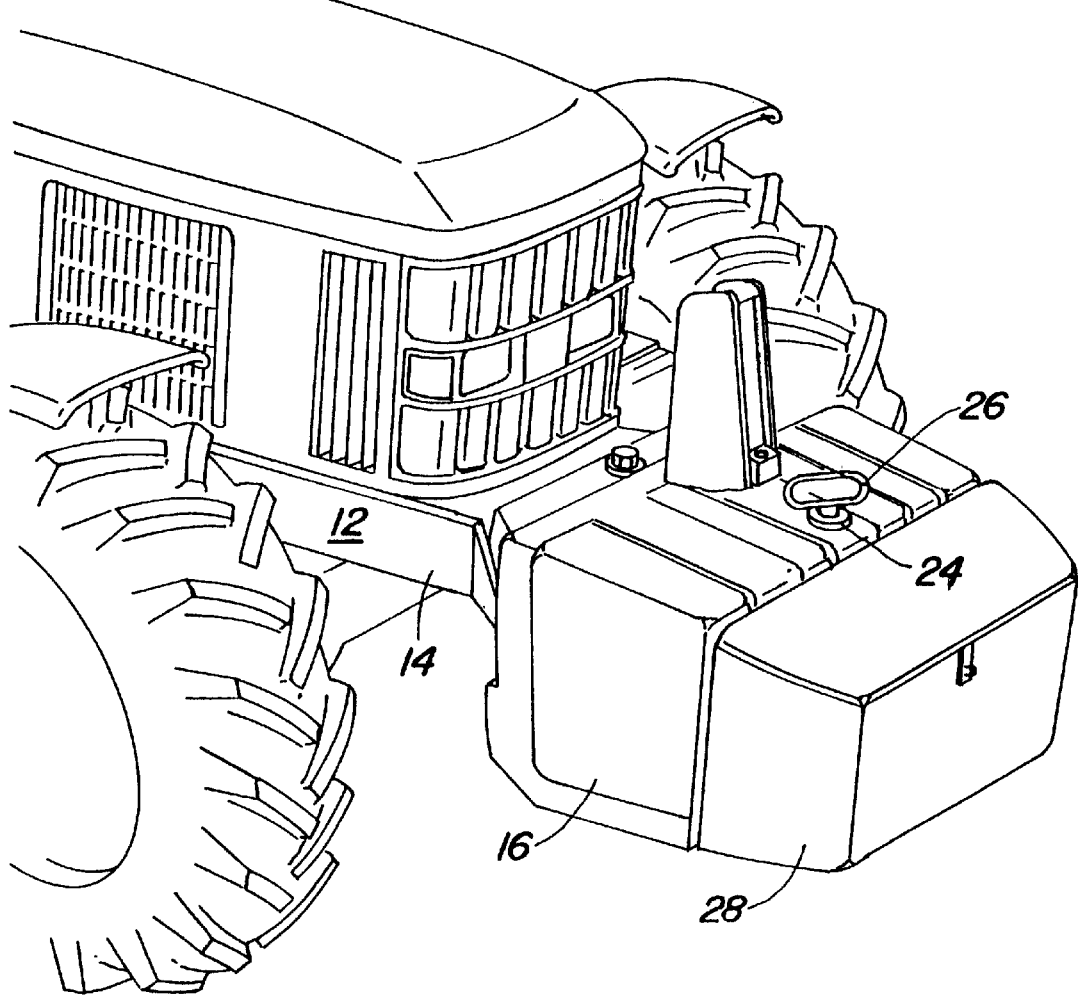

STORAGE CONTAINER ATTACHMENT DEVICE

FIELD OF THE INVENTION

The invention relates to a device for detachably attaching a storage container to the exterior of a utility vehicle, such as a tractor.

BACKGROUND OF THE INVENTION

Detachable storage containers are often externally mounted to utility vehicles. Such containers can be used as toolboxes, for storage of the tools necessary for maintenance of the vehicle, and for storage of tools for installation tasks and minor repairs. For example, it is known to mount a bracket near the steps of the John Deere 6400 series tractor, and to attach thereto a toolbox. Since these storage containers are attached to the exterior sides of the vehicle, and because of the small amount of available space, known toolboxes are relatively small and permit only a few tools to be stored. When the utility vehicle is away from where it is usually kept for extended periods, many items that should be brought along cannot be or must be accommodated elsewhere, since there is no room in the toolbox. Such items may include chains, attachment devices, spare parts, a large hammer, protective clothing, and rubber boots. In the agricultural technology journal "profi" Nr. 7/00, page 4, a makeshift storage receptacle covered by canvas is shown, which is intended to remedy the shortcomings of the small original toolbox.

SUMMARY OF THE INVENTION

The object of the present invention is to provide an attachment device for attaching a large storage container to a utility.

This object of the invention is achieved by the present invention, wherein a storage container is detachably mounted to the outside of a utility vehicle, such as a tractor, by an attachment device which includes a mounting bar and a support bolts. The mounting bar projects essentially perpendicularly from the rear wall of the container toward the back and includes a mounting bore. The bolts also projects from the rear wall of the container toward the back. The projection distance of the bolts can be adjusted.

The storage container according to the invention is also suited for mounting to a towing attachment of a utility vehicle. The towing attachment is designed so that a towing bar or rope can be attached to it in an emergency as required by certain European regulations. The towing attachment has a jaw-like design. An essentially vertical cylindrical bore into which a pin can be inserted, extends through the center of the jaws. Towing attachments of this type are generally mounted to the central area of the front end of the vehicle and are immobile. They can also be attached to the rear end of the vehicle. The invention exploits the fact that sufficient room is available in these areas for a storage container, so that the container can be made sufficiently large, regardless of the space restrictions imposed by the vehicle contours.

Weights are often attached to the front of farming tractors for ballast. These front weights include a standard towing attachment in the form of a front recess through which a vertical, cylindrical recess extends that receives the bolt.

The storage container of the present invention can be attached directly to the vehicle or via a ballast weight, by means of the above-described towing attachment, in which case the mounting bar is pushed into the jaw-like hitch recess of the towing attachment until the vertical recess of the towing attachment is aligned in the vertical recess in the mounting bar of the storage container. The pin of the towing attachment is then inserted into the recess. Finally, the support bolts are screwed in until their free ends butt against the vehicle or the ballast weight in the area of the jaw-like hitch recess, and thus support the storage container against the vehicle or ballast weight. The contact between the storage container and the vehicle is sufficiently tight that they will also not move against one another, while the vehicle is in operation, and no rattling occurs. Should it be necessary to use the towing attachment, the storage container can be easily detached by loosening the bolts and removing the pin.

BRIEF DESCRIPTION OF THE DRAWINGS

FIG. 1 is a front sectional view of a farming tractor with a storage container according to the invention attached to a ballast weight.

DESCRIPTION OF THE PREFERRED EMBODIMENT

Figure 2:
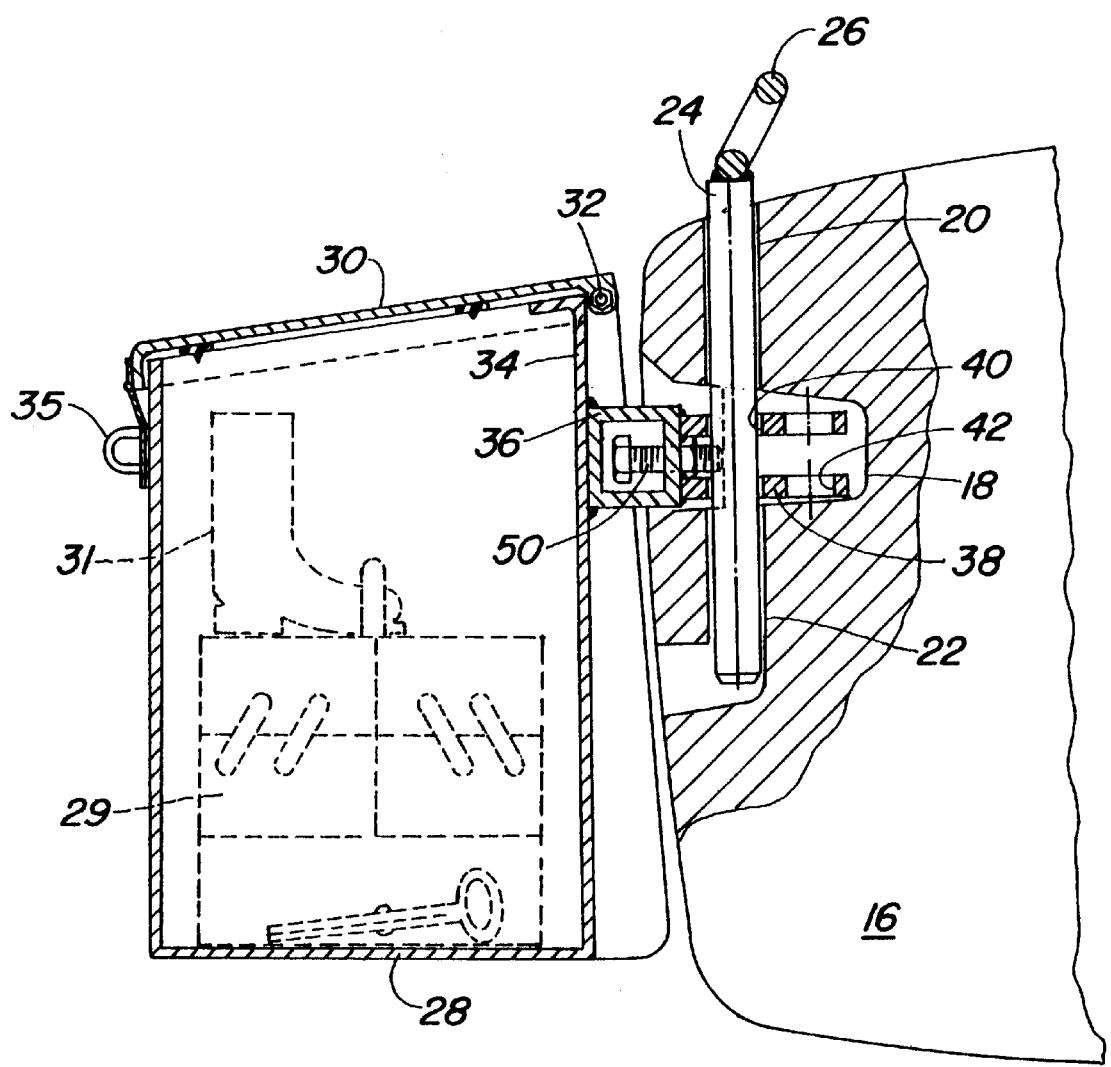
FIG. 2 is a cross-sectional view of a storage container according to the invention.

FIG. 1 shows a carrying element 14 mounted on the front area of bridge frame 12 of a partially shown farming tractor 10, to which ballast weight 16 is attached. The weight 16 may be attached to carrying element 14 in a known conventional manner. Instead of ballast weight 16, which can be handled as a single unit, conventional plate-shaped ballast weights can be used.

Ballast weight 16 includes a towing attachment in its front area and which features jaw-like hitch recess 18, as well as vertically-running cylindrical recesses or slots 20, 22. Pin 24, which includes a handling ring 26 on its top end, is inserted from the top down into cylindrical recess 20, 22.

Storage container or box 28 is attached to the front side of ballast weight 16. Box 28 is essentially rectangular and contains a portable toolbox 29 for the storage of various items, such as tongs and rubber boots 31, as well as other items. As is evident from FIG. 1, the outer contours of storage container 28 match those of ballast weight 16 to produce a uniform total contact pressure, in terms of the lateral and height dimensions of the container, on the one hand, and the rounding of its edges, on the other. The storage container 28 may taper somewhat towards the front.

Figure 3:
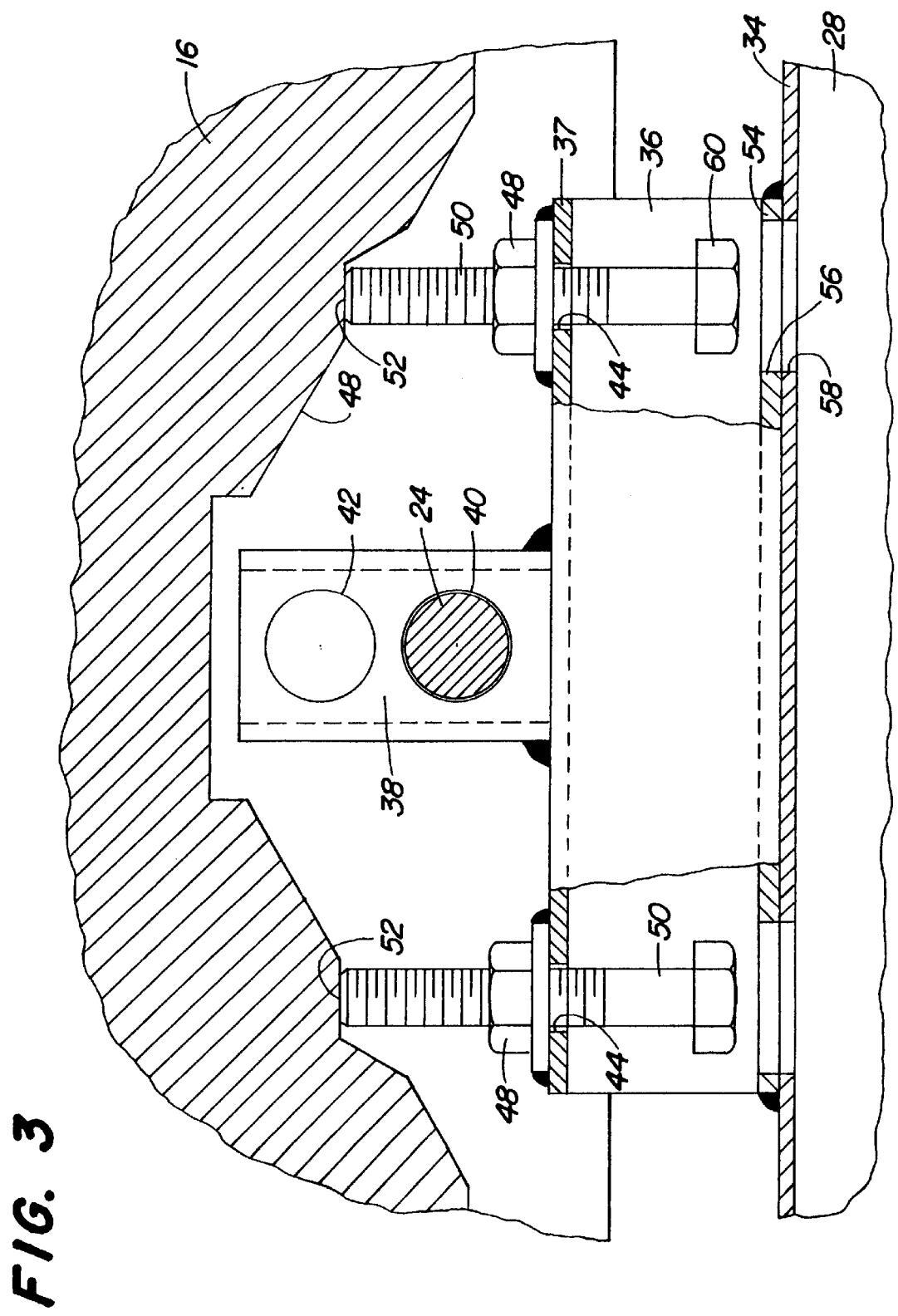
FIG. 3 is a horizontal cross sectional view through the attachment means of the storage container of FIG. 1

Storage container 28, represented schematically in FIG. 2, has a top opening that can be closed with lid 30. Lid 30 is connected to the upper area of essentially vertical rear wall 34 of the container by hinge 32. It can be closed with a suitable latch 35. In the upper third of rear wall 34 of the container 28, a rail 36 which has an essentially hollow rectangular cross section and extends in a horizontal direction, is welded in place. As shown in FIG. 3, the length of rail 36 is matched to the length of the jaw-like hitch recess 18 of ballast weight 16. The rail 36 increases the rigidity of the container 28 and carries the mounting bar 38. The dimensions of the hollow section are matched to the space requirements of the recess 18 of the towing attachment.

Mounting bar 38 is welded in place on rearwardly facing side 37 of rail 36, and extends into jaw-like hitch recess 18. Mounting bar 38 consists of a rectangular, hollow section, which projects from rail 36 in the direction of ballast weight 16. Two mounting bores 40, 42 pass vertically through mounting bar 38, i.e., through its upper and lower sections. Bore 40 receives pin 24, while the other bore 42 is provided for other attachments. The mounting bar 38 must sustain the weight of the storage container including its contents, as well as the attachment forces and dynamic forces. Thus, it must be configured to be sufficiently stable. In order to adapt the storage container 28 to different mounting requirements, multiple vertical through-holes can be formed in the mounting bar 38, side by side or one behind the other, so that a bolt can be inserted into the appropriate hole.

Two bores 44 are provided on rear side 37 of rail 36 alongside mounting bar 38. Threaded nuts 48 aligned with bores 44, are welded in place on rear side 37. Bolts 50 are threaded into each nut 48 and act as support elements. Each bolt 50 has a free end which engages and is supported on support surface 52 of jaw-like hitch recess 18. Relatively large bores 56, 58 are formed in forward-facing side 54 of rail 36, which is attached to rear side 34 of storage container 28, as well as in aforementioned rear side 34, through which bolts 50 can be inserted for mounting. The diameters of bores 56, 58 are larger than the circumference of a tool (not shown) that is applied to bolt heads 60. By screwing bolts into and out of the nuts 48, one can adjust the length of the bolts 50 which extends from the nuts 48 to surfaces 52. Alternatively, the nuts 48 can be attached to the rear wall 34 of the container 28 or to the rail 36.

In order to mount container 28 to ballast weight 16, container 28 is lifted, and its mounting bar 38 is inserted into the recess 18 of ballast weight 16. Pin 24 is then inserted into bores 20, 40, 22. Finally, both bolts 50 are uniformly screwed into flange nuts 48 until their free ends rest against support surfaces 52. By tightening bolts 50, container 28 is braced against ballast weight 16, so that it cannot move relative to ballast weight 16. Since the towing attachment is standardized, a correspondingly matched storage container can be attached to different vehicles without problem.

Preferably, the mounting bar 38 is attached to a middle portion of the container 28 with respect to its transverse dimension. One bolt 50 is symmetrically provided on each side of the mounting bar 38. Optimally, the mounting bar 38 and the bolts 50 are located in the upper third of the rear wall 34 of the container 28. This results in good stability, as well as good transfer of weight between the container 28 and vehicle 10.

In the front area of the tractor 10, room for attachments is not restricted, so that the container 28 can be made relatively large. In this arrangement, it extends past the front contours of the vehicle 10 or of the ballast weight 16 and its lateral and height dimensions are matched to the structural shape of the front of the vehicle. It is possible to provide a storage container with a 45 liter volume, which can store many other items besides a conventional portable toolbox, such as chains, attachment devices, spare parts, a large hammer, protective clothing, and rubber boots. The storage container 28 mounted in the front or the rear area of the vehicle is easily accessible from three sides.

Preferably, the storage container 28 is substantially rectangular. For aesthetic reasons, it is advantageous to determine the shape and design of the container based on the shape of the vehicle, so that the rounding and, if present, the tapering of the front contours of the vehicle and/or of the front weight is continued by the shape of the storage container. It is also possible to design the storage container 28 so that it can be matched to various model of tractors.

While the present invention has been described in conjunction with a specific embodiment, it is understood that many alternatives, modifications and variations will be apparent to those skilled in the art in light of the foregoing description. Accordingly, this invention is intended to embrace all such alternatives, modifications and variations which fall within the spirit and scope of the appended claims.

What is claimed is:

1. An attachment device for detachably attaching a storage container to a utility vehicle, the attachment device comprising:

a mounting bar which projects from a wall of the container and which includes a mounting bore extending therein, the mounting bar projecting rearwardly from a rear wall of the container, the mounting bore is a cylindrical through-hole which extends essentially vertically and receives an attaching pin; and an adjustable support element which projects from the wall of the container by a variable distance.

2. The attachment device of claim 1, wherein:

the support element comprises a bolt which can be screwed into a threaded opening in the wall of the container rear wall.

3. The attachment device of claim 1, wherein:

the mounting bar is attached to a middle portion of the wall of the container, and the support element comprises a pair of bolts which are screwed into threaded members on either side of the mounting bar.

4. The attachment device of claim 1, wherein:

the container is substantially rectangular in shape.

5. The attachment device of claim 1, wherein:

the container is open at the top and includes a lid which is hinged to a rear wall of the container.

6. The attachment device of claim 1, wherein:

the attachment device is adapted to attach the container to a towing attachment of the utility vehicle.

7. The attachment device of claim 1, wherein; the attachment device is adapted to attach the container to a ballast weight for a utility vehicle having a towing attachment.

8. The attachment device of claim 1, wherein:

a horizontally extending rail is fixed to a rear wall of the rear container, the rail carrying the mounting bar and the support element.

9. The attachment device of claim 8, wherein:

the support element comprises a bolt which can be screwed into a threaded opening in the rail.

10. An attachment device for detachably attaching a storage container to a utility vehicle, the attachment device comprising:

a mounting bar which projects from a wall of the container and which includes a mounting bore extending therein, the mounting bar having a rectangular hollow member with upper and lower parts through which extends of the mounting bore; and an adjustable support element which projects from the wall of the container by a variable distance.

11. An attachment device for detachably attaching a storage container to a utility vehicle, the attachment device comprising:

a mounting bar which projects from a wall of the container and which includes a mounting bore extending therein; and an adjustable support element which projects from the wall of the container by a variable distance; and a horizontally extending rail is fixed to a rear wall of the rear container, the rail carrying the mounting bar and the support element, the rail including a threaded member for receiving a bolt and an opening, aligned with the threaded member, the opening being adapted to allow a tool to be applied to a head of the bolt, and so that the bolt head can be inserted through the opening and into the threaded member.

12. An attachment device for detachably attaching a storage container to a utility vehicle, the attachment device comprising:

a mounting bar which projects from a wall of the container and which includes a mounting bore extending therein; and an adjustable support element which projects from the wall of the container by a variable distance, the mounting bar and the support element being coupled to an upper third of a rear wall of the container.

* * * * *